United States Patent
Charrier et al.

(10) Patent No.: US 11,732,608 B2
(45) Date of Patent: Aug. 22, 2023

(54) LUBRICATING OIL DISTRIBUTOR FOR A MECHANICAL REDUCTION GEAR OF AN AIRCRAFT TURBINE ENGINE

(71) Applicant: SAFRAN TRANSMISSION SYSTEMS, Colombes (FR)

(72) Inventors: Mathieu Jean Charrier, Moissy-Cramayel (FR); Gilles Gaston Jacques Gouin, Moissy-Cramayel (FR); Boris Pierre Marcel Morelli, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 837 days.

(21) Appl. No.: 16/723,491

(22) Filed: Dec. 20, 2019

(65) Prior Publication Data

US 2020/0200042 A1    Jun. 25, 2020

(30) Foreign Application Priority Data

Dec. 21, 2018 (FR) ....................................... 1873845

(51) Int. Cl.
| | |
|---|---|
| *F01D 25/18* | (2006.01) |
| *B64D 33/08* | (2006.01) |
| *F16H 57/04* | (2010.01) |

(52) U.S. Cl.
CPC ............ *F01D 25/18* (2013.01); *B64D 33/08* (2013.01); *F16H 57/042* (2013.01); *F16H 57/0486* (2013.01)

(58) Field of Classification Search
CPC ....... F01D 25/18; B64D 33/08; F16H 57/042; F16H 57/0431; F16H 57/0456; F02C 7/06; F02C 7/36
See application file for complete search history.

(56) References Cited

U.S. PATENT DOCUMENTS

| | | | | |
|---|---|---|---|---|
| 2013/0283756 A1* | 10/2013 | Baker | ...................... | F02C 7/06 137/561 A |
| 2014/0294558 A1* | 10/2014 | Haugh | ...................... | F02C 7/14 415/115 |
| 2016/0010550 A1* | 1/2016 | Baker | ..................... | F01D 25/18 137/561 A |
| 2016/0273385 A1* | 9/2016 | Otto | ....................... | F01D 9/065 |
| 2016/0369884 A1* | 12/2016 | Otto | ......................... | F02K 3/06 |
| 2017/0130605 A1* | 5/2017 | Gerstler | ............. | F16H 57/0417 |

OTHER PUBLICATIONS

"French Search Report," FR Application No. 1873845 (dated Sep. 13, 2019) (with English language cover sheet).

\* cited by examiner

*Primary Examiner* — Michael R Mansen
*Assistant Examiner* — Mark K Buse
(74) *Attorney, Agent, or Firm* — Womble Bond Dickinson (US) LLP

(57) ABSTRACT

Lubricating oil distributor for a mechanical reduction gear of a turbine engine, in particular of an aircraft, wherein it has a general annular shape around an axis X and is formed of a single part, the distributor including first and second independent oil circuits, the first oil circuit including a first oil inlet connected by a first annular chamber to several oil outlets, and the second oil circuit including a second oil inlet connected by a second annular chamber to several oil outlets, the first chamber including a section that is at least partially nested in a section of the second chamber.

19 Claims, 5 Drawing Sheets

LUBRICATING OIL DISTRIBUTOR FOR A MECHANICAL REDUCTION GEAR OF AN AIRCRAFT TURBINE ENGINE

TECHNICAL FIELD OF THE INVENTION

The present invention relates to the field of reduction gears for turbine engines, in particular of an aircraft.

TECHNICAL BACKGROUND

The state of the art includes, in particular, documents WO-A1-2010/092263, FR-A1-2 987 416, FR-A1-3 041 054, US-A1-2013/283756 and FR-A1-3 047 279.

The purpose of a mechanical reduction gear is to change the speed to torque ratio between the input shaft and the output shaft of a mechanical system.

The new generations of bypass turbine engines, in particular turbine engines with high dilution rates, comprise a mechanical reduction gear that drives the shaft of a fan. Usually, the purpose of the reduction gear is to transform the "fast" rotational speed of a power turbine into a slower rotational speed for the shaft driving the fan.

This type of reduction gear comprises a central pinion, termed sun gear, a ring gear and pinions termed planet gears, the latter engaging between the sun gear and the ring gear. The planet gears are maintained by a chassis termed planet-carrier. The sun gear and the ring gear are planetary elements because their axes of revolution are the same as the longitudinal axis X of the turbine engine. Each planet gear has a different axis of revolution, evenly distributed over a single operating diameter around the axis of the planetary elements. These axes are parallel with the longitudinal axis X.

There are several reduction gear architectures. According to the state of the art in the field of bypass turbine engines, the reduction gears are of the planetary or epicyclic type In other similar applications, "differential" or compound architectures can be found.

- In a planetary reduction gear, the planet carrier is fixed and the ring gear constitutes the output shaft of the device that rotates in the opposite direction to the sun gear.
- In an epicyclic reduction gear, the ring gear is fixed and the planet-carrier constitutes the output shaft of the device that rotates in the same direction as the sun gear.
- In a differential reduction gear, no element is rotationally fixed. The ring gear rotates in the opposite direction to the sun gear and the planet-carrier.

The reduction gears can comprise one or several gearing stages. This gearing is achieved in different ways, such as by contact, by friction and even by magnetic fields. There are several types of gearing by contact, such as straight or helical gearings.

The present invention proposes a simple, efficient and economical improvement to optimise the lubrication of a reduction gear.

SUMMARY OF THE INVENTION

The invention relates to a lubricating oil distributor for a mechanical reduction gear of a turbine engine, in particular of an aircraft, said distributor having a general annular shape around an axis X and comprising first and second independent oil circuits, said first oil circuit comprising a first oil inlet connected by a first annular chamber to several oil outlets, and said second oil circuit comprising a second oil inlet connected by a second annular chamber to several oil outlets, characterised in that it is formed of a single part, and in that said first chamber comprises a section that is at least partially nested in a section of said second chamber.

This type of oil distributor therefore comprises two independent circuits. The first circuit can be used to supply oil to the gearing teeth in the reduction gear, such as the gearings of the sun gear and of the planet gears of the reduction gear. The lubricating oil of the first circuit is generally at a temperature T1. The second circuit can be used to supply oil to the bearings of the planet gears of the reduction gear. The lubricating oil of the second circuit is generally at a temperature T2 that is greater than T1. The distributor therefore supplies the reduction gear with two oils at different temperatures, these temperatures being selected to optimise the lubricating of the parts of the reduction gear. During operations, the oil that has lubricated these parts is projected radially outwards by centrifugal forces and has a temperature greater than its initial temperature, by heat transfer from the lubricated parts. This heated oil is likely to come into contact with the distributor and to heat by conduction the oils circulating in the circuits of the distributor, in particular the colder oil at temperature T1. This cold oil is thus likely to be heated by the oil that served to lubricate the reduction gear, which could negatively impact the lubricating performance of this colder oil. The invention proposes overcoming this problem by thermally insulating at least a part of the circuit comprising the colder oil. This is possible by nesting one section of the oil chambers in the other. This configuration leads to an "inner" chamber that is thermally insulated by an "outer" chamber. The oil that has served to lubricate the reduction gear can flow around the outer chamber, thereby limiting the risks of heating the oil in the inner chamber.

The proposed solution is compatible with all types of gearing (straight or helical), and every type of planet-carrier, both single block or of the cage/cage-carrier type.

The distributor according to the invention can comprise one or several of the following characteristics, taken individually or in combination:

- Said first and second chambers have sections of different shapes and sizes,
- the section of said first chamber is at least partially surrounded by the section of said second chamber,
- said first and second chambers extend over the same circumference,
- said first and second chambers have transversal dimensions measured along the axis X that are different,
- said first and second chambers have transversal dimensions measured perpendicular to said axis X that are different,
- said first and second chambers are formed by two coaxial tubular rings,
- the ring of said first chamber comprises an outer surface that is directly connected or connected by physical bridges to an inner surface of the ring of said second chamber, and
- the section of said first and second chambers is generally circular or polygonal.

The invention further relates to a mechanical reduction gear of a turbine engine, in particular of an aircraft, comprising a distributor such as described above.

The invention further relates to a method for manufacturing a distributor such as described above, comprising a step of additive manufacturing of said distributor.

BRIEF DESCRIPTION OF THE FIGURES

Other characteristics and advantages will appear more clearly upon reading the following description of a nonlimiting embodiment of the invention and with reference to the appended drawings, in which.

DETAILED DESCRIPTION OF THE INVENTION

Figure 1:
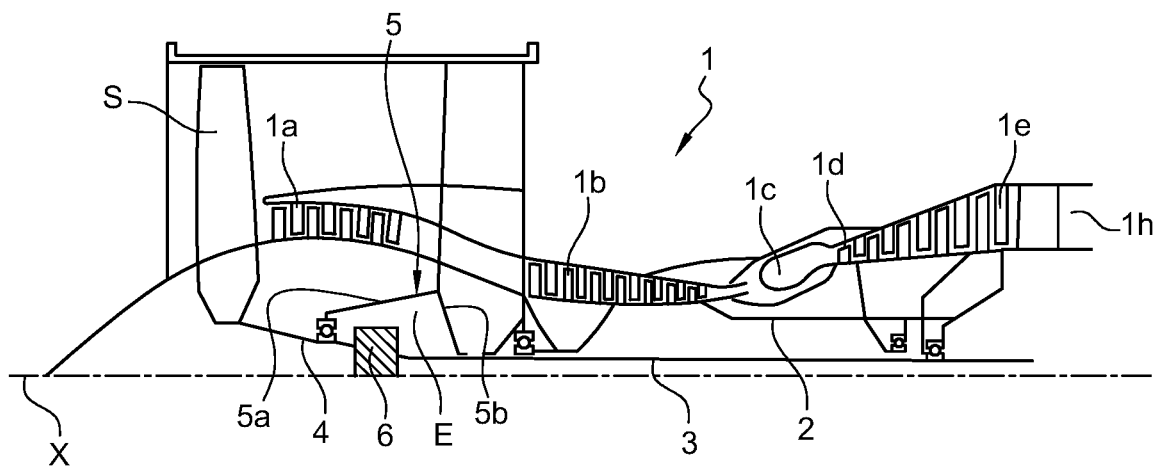
FIG. 1 is a schematic axial cross-section view of a turbine engine comprising the invention.

FIG. 1 describes a turbine engine 1 that comprises, conventionally, a fan S, a low-pressure compressor 1a, a high-pressure compressor 1b, an annular combustion chamber 1c, a high-pressure turbine 1d, a low-pressure turbine 1e, and an exhaust pipe 1h. The high-pressure compressor 1b and the high-pressure turbine 1d are connected by a high-pressure shaft 2 and form with the latter a high-pressure (HP) body. The low-pressure compressor 1a and the low-pressure turbine 1e are connected by a low-pressure shaft 3 and form with the latter a low-pressure (LP) body.

The fan S is driven by a fan shaft 4, which is driven with the LP shaft 3 by means of a reduction gear 6. The reduction gear 6 is generally of the planetary or the epicyclic type.

Although the following description relates to a planetary reduction gear or an epicyclic reduction gear, it also applies to a mechanical differential in which the three components, i.e. the planet-carrier, the ring gear and the sun gear are rotationally mobile, the rotation speed of one of these components depending on the speed difference of the two other components, in particular.

The reduction gear 6 is positioned in the front part of the turbine engine. A fixed structure comprising schematically, in this case, an upstream part 5a and a downstream part 5b, constituting the engine crankcase or stator 5, is arranged to form an enclosure E around the reduction gear 6. This enclosure E is here closed in the upstream part by gaskets located at the level of a bearing and allowing the passage of the fan shaft 4, and in the downstream section by gaskets located at the level of the passage of the LP shaft 3.

Figure 2:
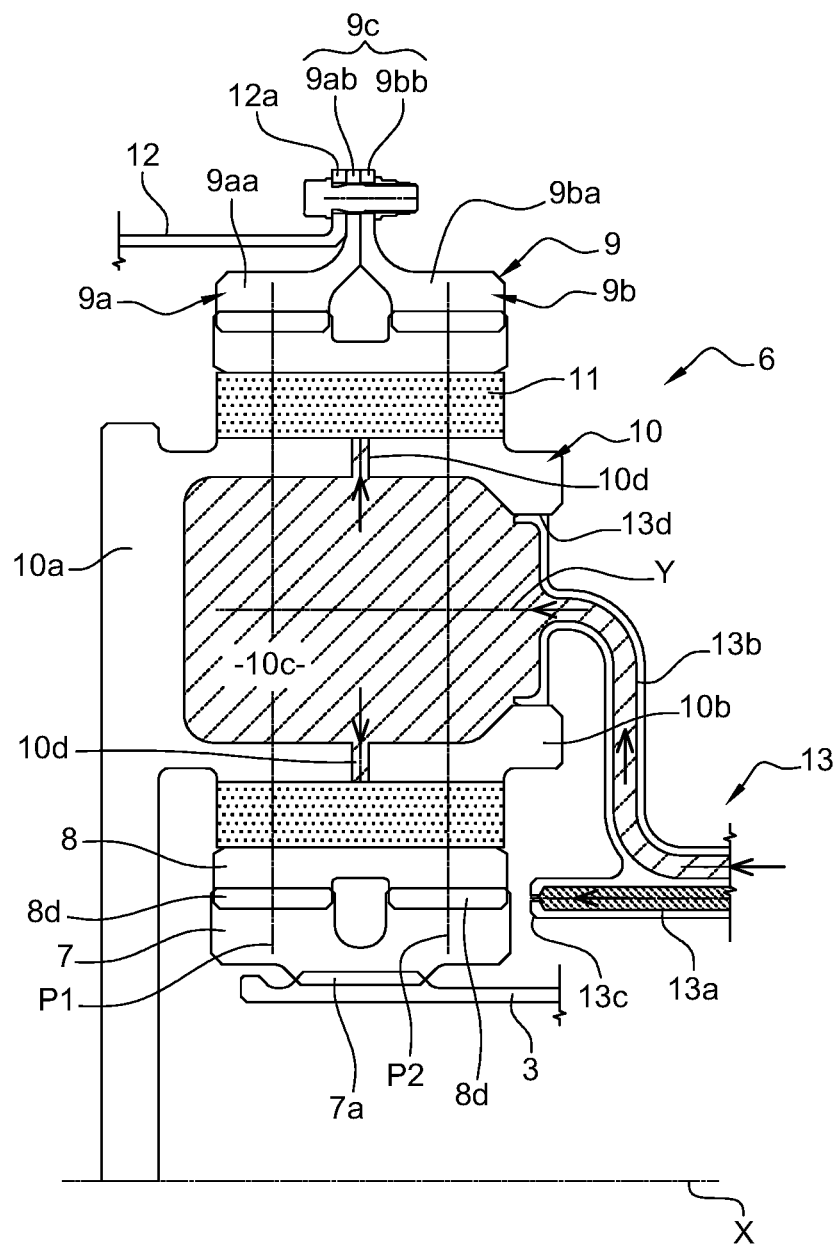
FIG. 2 is a partial view showing an axial cross-section of a mechanical reduction gear.

FIG. 2 shows a reduction gear 6 that can have different architectures depending on whether some parts are fixed or rotating. At the inlet, the reduction gear 6 is connected to the LP shaft 3, for example by means of inner splines 7a. The LP shaft 3 drives a planet pinion termed sun gear 7. Conventionally, the sun gear 7, of which the axis of rotation is the same as that of the turbine engine X, drives a series of pinions termed planet gears 8, these planet gears being evenly distributed over a single diameter around the axis of rotation X. The number of planet gears 8 is generally between three and seven for this type of application.

The planet gears 8 are supported by a chassis termed planet-carrier 10. Each planet gear 8 rotates about its own axis Y and engages with the ring gear 9.

At the output, this provides:

In an epicyclic configuration, the planet gears 8 rotationally drive the planet-carrier 10 about the axis X of the turbine engine. The ring gear is secured to the engine crankcase or the stator 5 by means of a ring-carrier 12 and the planet-carrier 10 is secured to the fan shaft 4.

In a planetary configuration, the planet gears 8 are maintained by a planet-carrier 10 that is secured to the engine crankcase or the stator 5. Each planet gear drives the ring gear, which is supported on the fan shaft 4 by means of a ring-carrier 12.

Each planet gear 8 is mounted free to rotate by means of a bearing 11, for example a roller bearing or a hydrodynamic bearing. Each bearing 11 is mounted on one of the axes 10b of the planet-carrier 10 and all the axes are positioned with respect to one another by means of one or several structural chassis 10a of the planet-carrier 10. The number of axes 10b and of bearings 11 is equal to the number of planet gears. For operating, assembly, manufacturing, control, repairs or replacement reasons, the axes 10b and the chassis 10a can be divided into several parts.

For the reasons mentioned above, the gearing of a reduction gear can be divided into several helices, each with a median plane P. In this example, we will detail the operation of a reduction gear with several helixes and with a ring gear divided into two half-ring gears:

A front half-ring gear 9a consisting of a rim 9aa and an attachment half-flange 9ab. The rim 9aa comprises the front helix of the gearing of the reduction gear. This front helix engages with that of the planet gear 8, which in turn engages with that of the sun gear 7.

A rear half-ring gear 9b consisting of a rim 9ba and an attachment half-flange 9bb. The rim 9ba comprises the rear helix of the gearing of the reduction gear. This rear helix engages with that of the planet gear 8, which in turn engages with that of the sun gear 7.

Although the helix widths vary between the sun gear 7, the planet gears 8, and the ring gear 9 because of overlapping gearings are all centred on a median plane P for the front helices, and on another median plane P for the rear helices. In the other figures, in the case of a roller bearing with two rows of rollers, each row of rolling elements is also centred on two median planes.

The attachment half-flange 9ab of the front ring gear 9a and the attachment half-flange 9bb of the rear ring gear 9b form the attachment flange 9c of the ring gear. The ring gear 9 is secured to a ring-carrier by assembling the attachment flange 9c of the ring gear to the attachment flange 12a of the ring-carrier by means of a bolted assembly for example.

The arrows of the FIG. 2 show the path of the oil in the reduction gear 6. The oil arrives in the reduction gear 6 from the stator part 5 in the distributor 13 by different means that are not detailed in this view as they are specific to one or several types of architecture. The distributor is divided into 2 parts, and generally each part has the same number of planet gears. The purpose of the injectors 13a is to lubricate the gearings and the purpose of the arms 13b is to lubricate the bearings. The oil is brought to the injector 13a, exiting at its end 13c to lubricate the gearings. The oil is also brought to the arm 13b and circulates through the supply intake 13d of the bearing. The oil then circulates through the axis or in one or several buffer zones 10c to then exit through the orifices 10d in order to lubricate the bearings of the planet gears.

Figure 3:
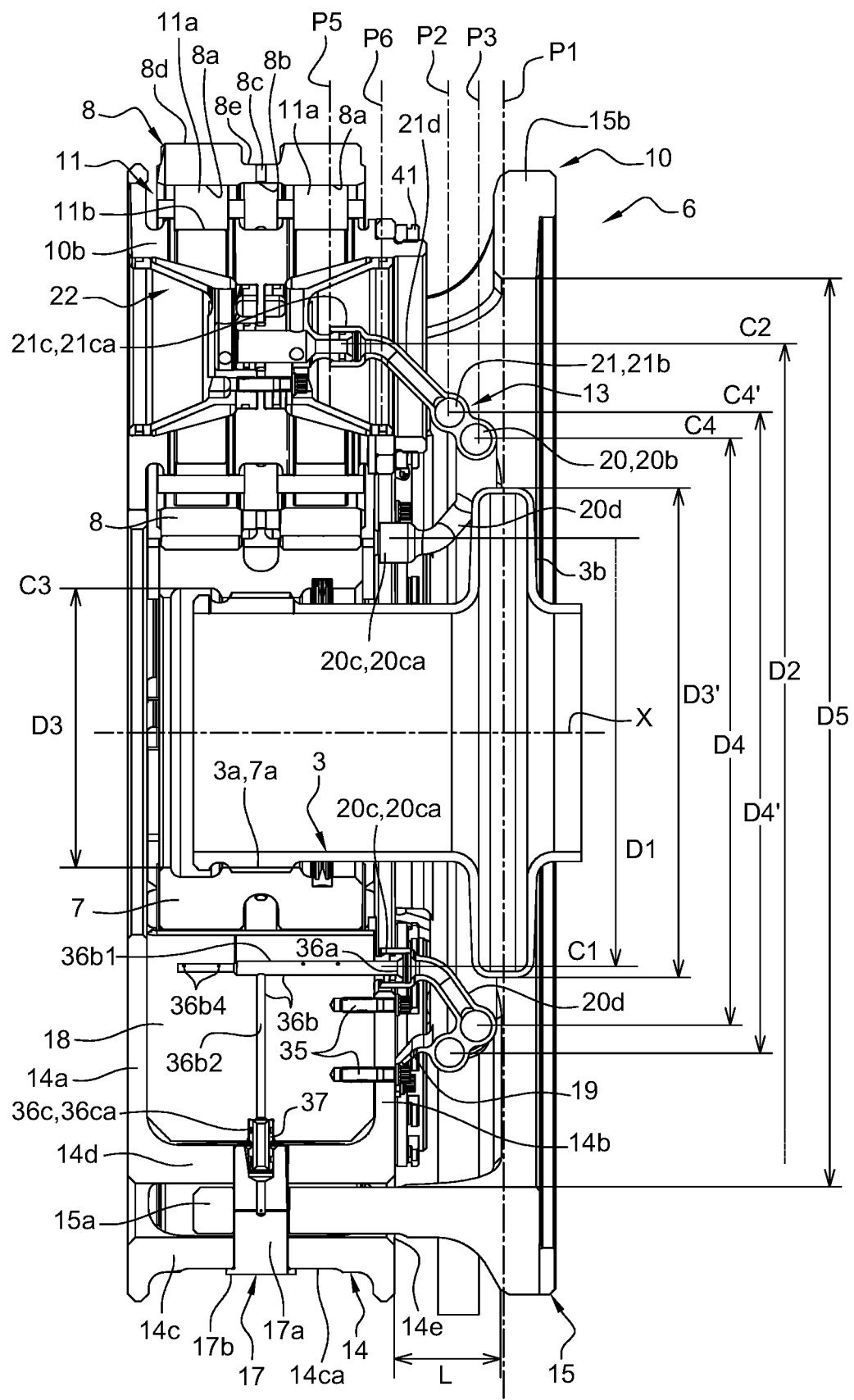
FIG. 3 is a partial axial cross-section view of a mechanical reduction gear.
Figure 4:
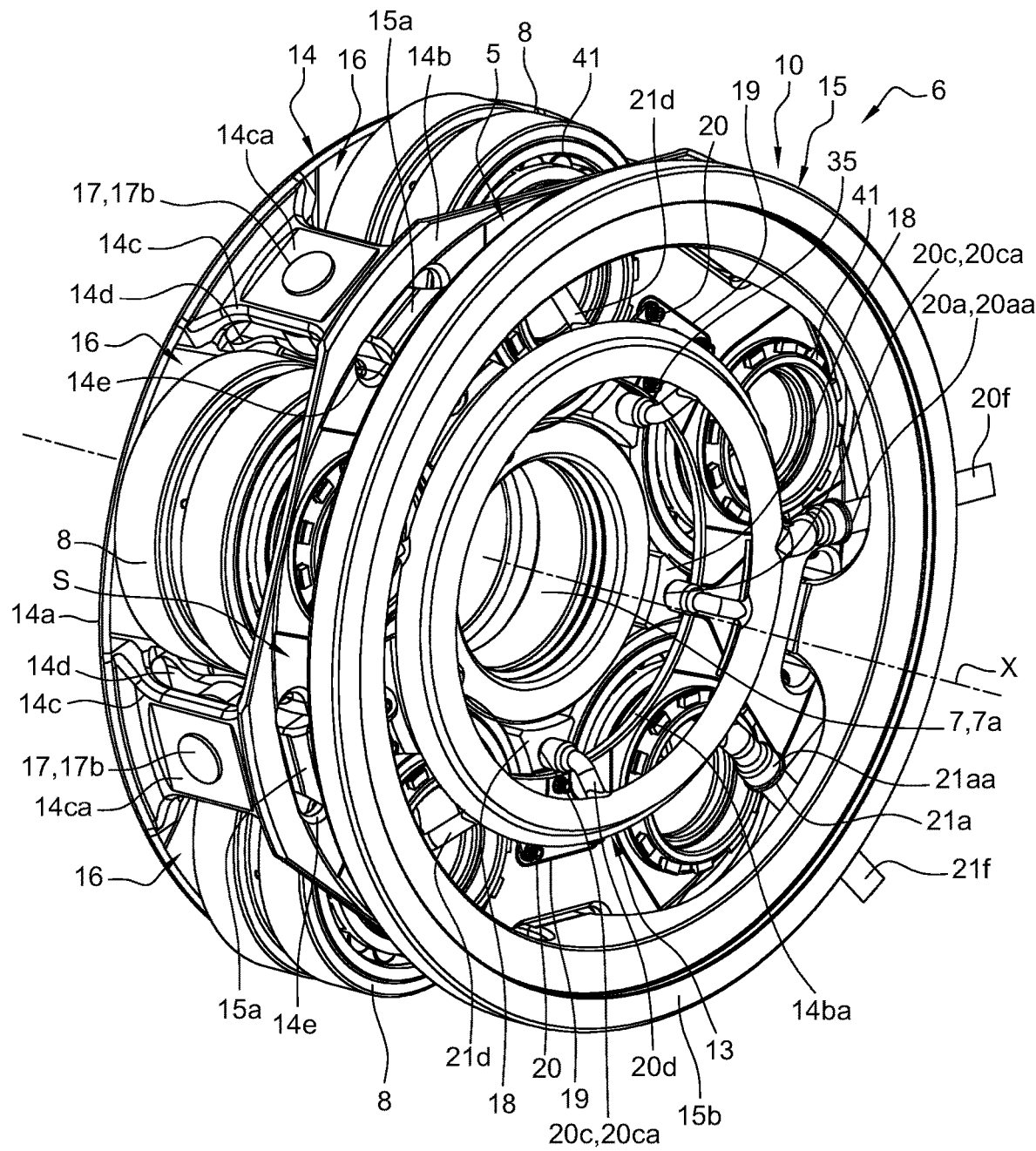
FIG. 4 is a perspective view of the reduction gear of FIG. 3.

FIGS. 3 and 4 show an embodiment of a reduction gear 6.

The reduction gear 6 of FIGS. 3 and 4 comprises a planet-carrier 10 of the cage 14 and cage-carrier 15 type, the cage 14 and the cage-carrier 15 being connected by ball and socket connections.

The cage 14 comprises two radial annular walls 14a, 14b that extend around the axis X, these walls 14a, 14b being parallel and being respectively a front radial wall 14a and a rear radial wall 14b. The walls 14a, 14b are connected to one another at the outer peripheries thereof by pairs of fins 14c, 14d, that are evenly distributed around the axis X. These pairs of fins provide a structural connection between the walls 14a, 14b. Each pair of fins comprises two fins, respectively radially external 14c and radially internal 14d, that extend substantially parallel along the axis X at a radial distance from one another.

The pairs of fins 14c, 14d define between them apertures 16 that extend circumferentially about the axis X and are axially delimited by the outer peripheral edges of the walls 14a, 14b. There are 5 pairs of fins in the example shown.

Each pair of fins forms a clevis to receive a finger 15a of the cage-carrier 15. In other words, the fins of each pair define between them a housing to receive a finger 15a of the cage-carrier 15. Oblong openings 14e are provided in the rear wall 14b so as to let the fingers 15a pass between the fins 14c, 14d. The wall 14a can comprise similar openings aligned axially with the openings 14e of the wall 14b.

The number of fingers 15a is equal to the number of pairs of fins 14c, 14d and is of 5 in the example shown. These fingers 15a extend axially in the upstream direction from a ring 15b of the cage-carrier 15 extending about the axis X. The fingers 15a of the cage-carrier 15 are engaged in the housings between the fins by an axial translation motion from the rear, through the openings 14e of the wall 14b.

Each finger 15a comprises, substantially in its middle, a recess for mounting a bearing (not shown) intended to be intersected by a cylindrical pin 17 supported by each pair of fins 14c, 14d. Each pin 17 intersects with the inter-fin housing and has a substantially radial orientation with respect to the axis X. Each pin 17 comprises a cylindrical body 17a connected at one end, here the radially external end, to a collar 17b. The pin 17 is here engaged by a motion of radial translation from the outside through the radial orifices of the fins 14c, 14d, its collar 17b being intended to come and bear radially against a flat face 14ca of the outer fin 14c. After the insertion of the pin 17 in the orifices of the fins, until the collar 17b comes to bear against the outer fin, the collar 17b is secured to the fin, for example by screwing.

As can be seen in the drawings, in the assembled position, the ring 15b of the cage-carrier 15 is axially offset by a predetermined distance L1 from the rear wall 14b opposite the cage 14 (FIG. 3). The annular space extending from the outer periphery of the cage 14 to the outer periphery of the cage-carrier 15 is divided in sectors by fingers 15a that thus define between them sectors of space S1 (FIG. 4).

The cage 14 defines an inner housing for the reception of the sun gear 7 with an axis X, of the planet gears 8 arranged around the sun gear 7 and engaging therewith, as well as of deflectors 18, that are described in detail below with reference to FIG. 14 and following.

As described above for FIG. 2, the sun gear 7 comprises inner splines 7a for coupling with outer complementary splines 3a of the LP shaft 3 (FIG. 3). It should be noted that the splines 3a are located at the front end of the LP shaft 3, which comprises a downstream segment 3b in the form of bellows. This segment 3b is here located in a plane P1 perpendicular to the axis X, which is axially offset from the cage 14 of the planet-carrier 10 and passes substantially through the ring 15b of the cage-carrier 15 in our example. This segment 3b provides the LP shaft 3 with some degree of flexibility that limits the transfer of stress from the engine to the reduction gear during operations. The splines 3a are in this case located on a circumference C3 with an axis X and a diameter D3, and the segment 3b has an outer diameter D3' that is greater than D3 and smaller than the inner diameter D5 of the ring 15b.

Figure 5:
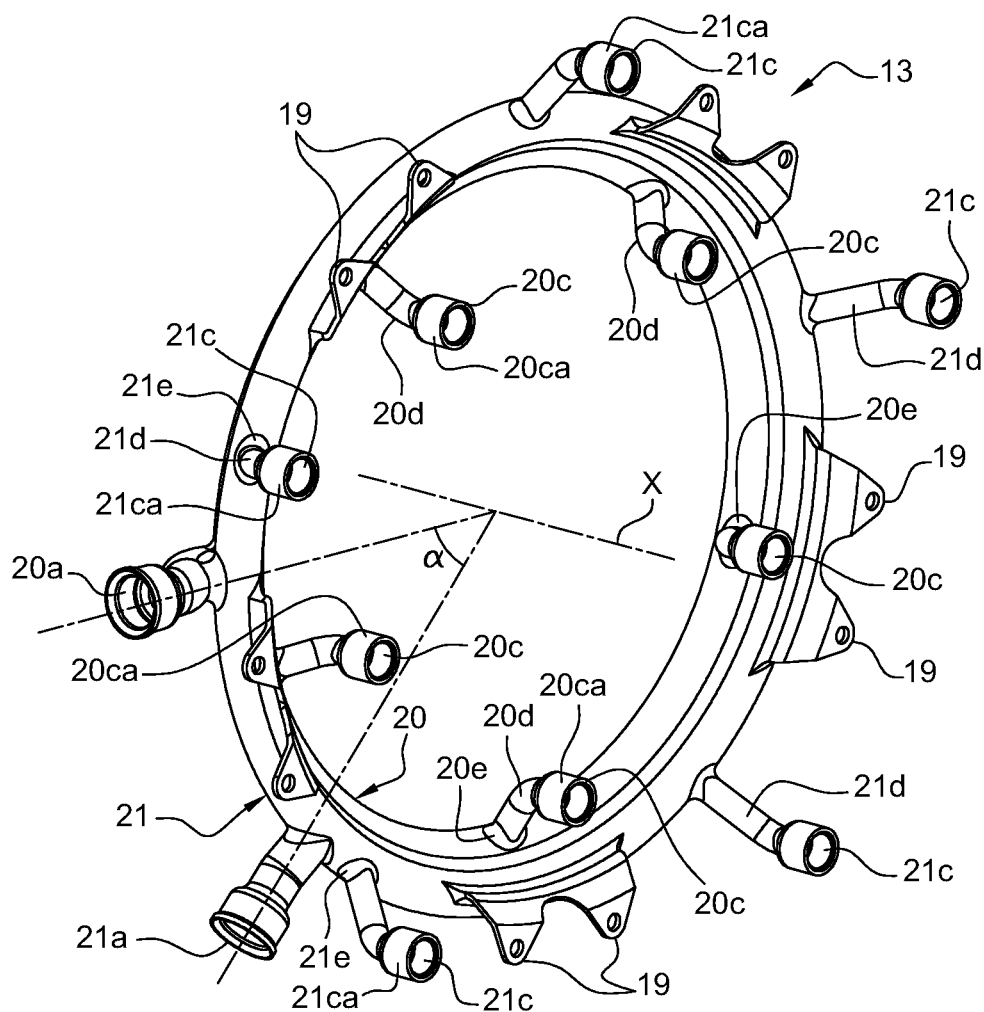
FIG. 5 is a perspective view of a lubricating oil distributor of the reduction gear of FIG. 3.

The reduction gear 6 comprises an improved lubricating oil distributor 13 that is better shown in FIG. 5.

The distributor 13 has a generally annular shape around the axis X and it is made of a single part. Here, it is provided and secured on the planet-carrier 10 and comprises, for this purpose, attachment lugs 19 on cage 14 of the planet-carrier and in particular on its rear wall 14b, as shown in FIG. 4. The lugs 19 are evenly distributed around the axis X and comprise portions pressed against the downstream radial face of the wall 14b and comprising orifices for the passage of screws 35, which are screwed in the tapped holes of the wall 14b.

The distributor 13 comprises first and second independent oil circuits 20, 21, the first oil circuit 20 comprising a first oil inlet 20a connected by a first annular chamber 20b to several oil outlets 20c distributed over a first circumference C1 about the axis X, and the second oil circuit 21 comprises a second oil inlet 21a connected by a second annular chamber 21b to several oil outlets 21c distributed over a second circumference C2 about the axis X (FIGS. 3 and 5).

The circumference C1 has a diameter D1 and the circumference C2 has a diameter D2, D2 being greater than D1. The oil outlets 20c are located on D1 or C1 and the outlets 21c are located on D2 or C2. In the example shown, D1 and D2 are both greater than D3 and smaller than D5.

The diameter of the distributor 13 is smaller than D5, which enables its assembly/disassembly without having to disassemble other elements of the reduction gear. Because of the pins 17 and the deflectors 18, the cage and the cage-carrier are mounted first, followed by the sun gear 7, the planet gears 8, the axes 10b and finally the distributor 13, as is described in further detail below.

The outer diameter of the distributor 13 corresponds to the end of the inlets 20a, 21a (which end at the same circumference).

The chambers 20b, 21b are formed by two coaxial and inextricably connected tubular rings, i.e. their tubular walls are welded together. The chambers have, along an axial cross-section, a generally circular shape and the passage sections of the chambers are substantially constant on their entire angular length and are substantially identical to one another.

The first chamber 20b extends substantially over a circumference C4 with a diameter D4 between D1 and D2. The second chamber 21b extends substantially over another circumference C4' with a diameter D4' between D1 and D2. D4' is greater than D4. The circumferences C4 and C4' are centred on the axis X. D1 is smaller than D4 and D4', whereas D2 is greater than D4 and D4'. It is advantageous that C4 and C4' are located substantially at mid-(radial) distance between C1 and C2, as this stiffens the distributor 13.

The greater diameter chamber 21b is located in front of the smaller diameter chamber 20b. As can be seen in FIG. 4, the chambers extend along planes P2, P3 that are perpendicular to the axis X and intersect with the cage 14, on the one hand, and with the ring 15b of the cage-carrier 15, on the other hand. This figure also shows that the plane P3, which intersects with the second chamber 20b or rear chamber, is close to the segment 3b of the shaft LP 3 and that its diameter D4' is greater than the diameter D3' of the segment 3b, in order to avoid any contact during operations.

Figure 6:
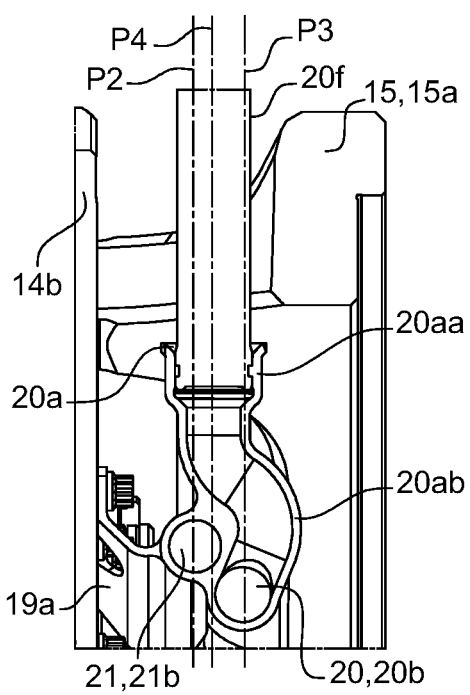
FIG. 6 is a cross-section view of a detail of the reduction gear of FIG. 3, and shows an oil inlet of the distributor of FIG. 5.
Figure 7:
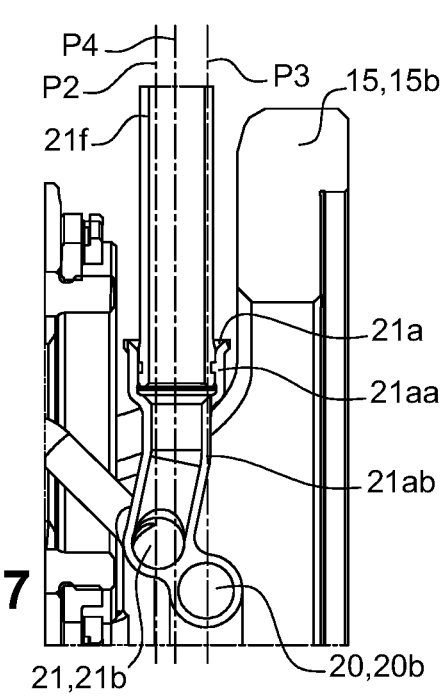
FIG. 7 is a cross-section view of a detail of the reduction gear of FIG. 3, and shows another oil inlet of the distributor of FIG. 5.

The inlets 20a, 21a are oriented in a radial direction with respect to the axis X. They are preferably located in a same plane P4 perpendicular to the axis X and are inclined with respect to one another in this plane P4 by a given angle α (FIGS. 5 to 7). This angle α is for example between 30 and 60°. As seen in FIG. 4, the inlets 20a, 21a are oriented respectively along directions, each intersecting with one of the abovementioned sectors of space S. A finger 15a of the cage-carrier passes between the two inlets 20a, 21a.

The planes P2, P3 and P4 are located between the cage 14 and the ring 15b of the cage-carrier 15 (FIGS. 6 and 7).

The distributor 13 is advantageously configured to be fluidly connected, at the level of its inlets and its outlets, by male-female fitting, i.e. by connections that only require fitting along an axial direction of motion of a male connector into a female connector. Even if a connector is presented in the following description as being male and intended to engage with a female connector, it can alternatively be replaced by a female connector intended, therefore, to engage with a male connector, and conversely.

With regard to the inlets 20a, 21a, each one comprises a female connector 20aa, 21aa in the example shown, intended to receive the male connector of a supply pipe 20f, 21f (FIGS. 4, 6 and 7). The pipes 20f, 21f are rectilinear and intersect with the abovementioned sectors of space S and are intended to also intersect with tubular arms of an intermediary crankcase of the turbine engine 1, for the purpose of connecting the distributor 13 to a source of lubricating oil. The number of arms of the crankcase can be greater than 5 and therefore than the number of sectors of space S. The sealing of the male-female connections can be achieved with O-rings or similar gaskets.

The female connectors 20aa, 21aa of the inlets 20a, 21a are connected to the respective chambers through conduits 20d, 21d. The connector 20aa of the inlet 20a is connected to the chamber 20b the farthest from the plane P4 by a conduit 20ab that is generally S-shaped (FIG. 6). The connector 21aa of the inlet 21a is connected to the chamber 21b the closest to the plane P4 by a conduit 21ab that is rectilinear or features a slight elbow (FIG. 7).

With regard to the outlets 20c, each one comprises a female connector 20ca in the example shown, intended to receive the male connector of one of the deflectors 18. These outlets 20c are oriented axially, all in the same direction, which here is forwards. The connectors 20ca of these outlets are connected to the chamber 20b by substantially L- or V-shaped ducts 20d (FIG. 5).

With regard to the outlets 21c, each one comprises a female connector 21ca in the example shown, intended to receive the male connector of one of the lubricating and cooling cores 22 of the axes 10b of the planet gears 8. These outlets 21c are oriented axially, all in the same direction, which here is forwards. The connectors 21ca of these outlets are connected to the chamber 21b by substantially L- or V-shaped conduits 21d.

As can be seen in FIG. 3, the lengths or axial dimensions of the ducts 20d and of the conduits 21d are different, the outlets 21c being located in a plane P5 perpendicular to the axis X, which is further forwards than the plane P6, which passes along the outlets 20c. The planes P5 and P6 are located in the cage 14.

Finally, as can be seen in FIG. 5, the ducts 20d are connected to the ring forming the chamber 20b by joints 20e located on the inner periphery of said ring, whereas the conduits 21d are connected to the ring forming the chamber 21b by joints 21e located on the outer periphery of said ring (FIG. 5).

As mentioned above and shown schematically in FIG. 8, the chambers 20b, 21b are formed by two inextricably connected coaxial tubular rings.

The oil that circulates in the chamber 20b has a temperature T1 that can be, for example, approximately 100° C. This "cold" oil is referenced H1. The oil that circulates in the chamber 21b has a temperature T2 that can be approximately 140° C. This "hot" oil is referenced H2. The temperatures T1 and T2 are not randomly selected; instead, they are determined to optimise the lubrication of the parts of the reduction gear. Having lubricated these parts, the oil is heated and can reach a temperature T3 of approximately 160° C., for example. This heated oil, referenced H3, undergoes centrifugal forces and can be projected onto the distributor 13. This oil H3 can heat, by conduction, the oils H1, H2. The temperature difference is greater between H3 and H1 (40° C. in the above example) than between H2 and H1 (20° C.). The oil H1 therefore risks being heated more and reaching a temperature that is greater than the optimal temperature of oil circulating in the first circuit.

Figure 9:
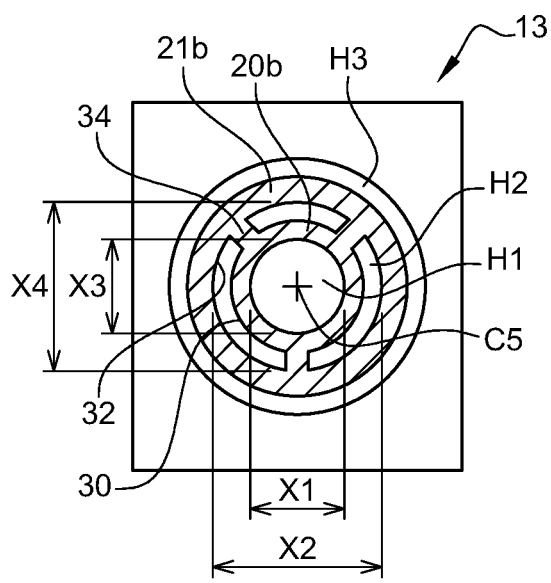
FIG. 9 is a simplified cross-section view of a distributor according to an alternative embodiment of the invention.
Figure 10:
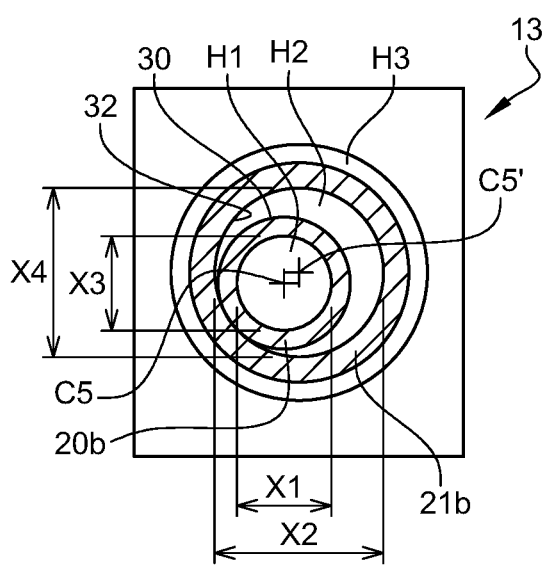
FIG. 10 is a simplified cross-section view of a distributor according to another alternative embodiment of the invention.
Figure 11:
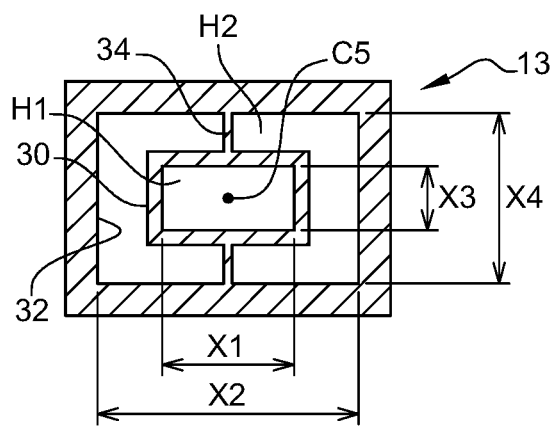
FIG. 11 is a simplified cross-section view of a distributor according to another alternative embodiment of the invention.

The invention proposes a solution to overcome this problem, which is illustrated by three alternative embodiments in FIGS. 9 to 11.

The invention proposes that the section of the first chamber 20b, for the circulation of the cold oil H1, be nested in the section of the second chamber 21b, for the circulation of the hot oil H2. This limits the risks of overheating of the oil H1 by the oil H3, as the oil H3 will be in contact primarily with the second chamber 21b and less with the first chamber 20b.

In this first alternative embodiment shown in FIG. 9, each chamber 20b, 21b is formed by a tubular ring that has in this case a circular or annular section. The chamber 20b has a circular section and extends over a circumference C5. The chamber 21b has an annular section and extends fully around the chamber 20b. The chamber 21b extends over the same circumference C5. The chamber 20b, termed inner chamber, is therefore fully insulated from the oil H3.

The ring of the chamber 20b comprises an outer surface 30 that is offset from the inner surface 32 of the ring of the chamber 21b. These surfaces 30, 32 are connected to one another by physical bridges 34. The distributor 13 can be made of a single part, in particular by additive manufacturing.

In this alternative embodiment shown in FIG. 10, each chamber 20b, 21b is formed by a tubular ring that has in this case a truncated circular section. The chamber 20b has a circular section and extends over a circumference C5. The chamber 21b has a truncated circular section and extends around the chamber 20b. The chamber 21b extends over a circumference C5' that has a diameter greater than that of C5. The chamber 20b, termed inner chamber, is fully insulated from the oil H3.

The ring of the chamber 20b comprises an outer surface 30 that is, in a single zone, in contact with the inner surface 32 of the ring of the chamber 21b. The surfaces 30, 32 are therefore fully connected and tangential to one another. The distributor 13 can be made of a single part, in particular by additive manufacturing.

In the alternative embodiment shown in FIG. 11, the sections of the chambers 20b, 21b are polygonal, and in particular rectangular. Each chamber is formed by a tubular ring that has in this case a rectangular section. The chambers 20b, 21b extend over a same circumference C5.

The ring of the chamber 20b comprises an outer surface 30 that is offset from the inner surface 32 of the ring of the chamber 21b. These surfaces 30, 32 are connected to one another by physical bridges 34. The distributor 13 can be made of a single part, in particular by additive manufacturing.

In another alternative embodiment that is not shown, it is possible to combine the embodiments of FIGS. 10 and 11 and therefore to have chambers with a polygonal section. One of the walls of one of the chambers could be shared with or the same as one of the walls of the other chamber. One of the chambers would have a rectangular section and the other chamber would be generally U-shaped.

Figure 8:
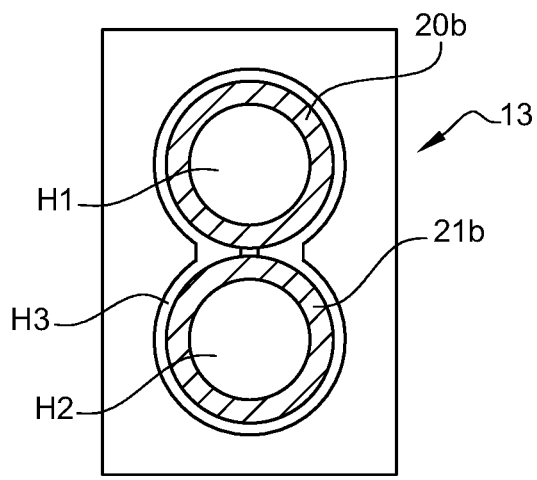
FIG. 8 is a simplified cross-section view of the distributor seen in FIGS. 3 and 7.

Unlike the chambers 20b, 21b of the distributor of FIG. 8, the chambers of the distributor of the alternative embodiments of FIGS. 9 to 11 have transversal dimensions X1 and X2, measured along the axis X, that are different. The chambers 20b, 21b of the distributor according to the alternative embodiments of FIGS. 9 to 11 also have transversal dimensions X3 and X4, measured perpendicular to the axis X, that are different. The dimensions X1 and X3 of the chambers 20b of the FIGS. 9 to 11 can be identical to that of the chamber 20b of FIG. 8. The dimensions X2 and X4 of the chambers 21b of the FIGS. 9 to 11 can be chosen so that the chambers have the same hydraulic section as that of the chamber 21b of FIG. 8.

The invention claimed is:

1. Lubricating oil distributor for a mechanical reduction gear of a turbine engine, said distributor having a general annular shape around an axis X and comprising first and second independent oil circuits, said first oil circuit comprising a first oil inlet connected by a first annular chamber to several oil outlets, and said second oil circuit comprising a second oil inlet connected by a second annular chamber to several oil outlets, wherein said first and second annular chambers are directly connected one to the other so as to form a single part, and in that said first chamber comprises a cross section that is at least partially nested in a cross section of said second chamber.

2. The lubricating oil distributor according to claim 1, wherein the section of said first chamber is at least partially surrounded by the cross section of said second chamber.

3. The lubricating oil distributor according to claim 1, wherein said first and second chambers extend over a same circumference.

4. The lubricating oil distributor according to claim 1, wherein said first and second chambers have transversal directions, measured along the axis X, that are different.

5. The lubricating oil distributor according to claim 1, wherein said first and second chambers have transversal directions, measured perpendicular to said axis X, that are different.

6. The lubricating oil distributor according to claim 1, wherein said first and second chambers are formed by two coaxial tubular rings.

7. The lubricating oil distributor according to claim 6, wherein the ring of said first chamber comprises an outer surface that is directly connected or connected by physical bridges to an outer surface of the ring of said second chamber.

8. The lubricating oil distributor according to claim 1, wherein said first and second chambers have a cross section that is generally circular or polygonal in shape.

9. Reduction gear of a turbine engine, in particular of an aircraft, comprising a lubricating oil distributor according to claim 1.

10. A method for manufacturing a lubricating oil distributor according to claim 1, comprising a step of additive manufacturing of said lubricating oil distributor.

11. The lubricating oil distributor defined by claim 1 wherein said turbine engine is an aircraft turbine engine.

12. A lubricating oil distributor for a mechanical reduction gear of a turbine engine, said distributor having a general annular shape around an axis X and comprising first and second independent oil circuits, said first oil circuit comprising a first oil inlet connected by a first annular chamber to several oil outlets, and said second oil circuit comprising a second oil inlet connected by a second annular chamber to several oil outlets, wherein said lubricating oil is formed of a single part, and in that said first chamber comprises a section that is at least partially nested in a section of said second chamber, and wherein said first and second chambers extend over a same circumference.

13. The lubricating oil distributor defined by claim 12 wherein said turbine engine is an aircraft turbine engine.

14. A lubricating oil distributor for a mechanical reduction gear of a turbine engine, said distributor having a general annular shape around an axis X and comprising first and second independent oil circuits, said first oil circuit comprising a first oil inlet connected by a first annular chamber to several oil outlets, and said second oil circuit comprising a second oil inlet connected by a second annular chamber to several oil outlets, wherein said lubricating oil is formed of a single part, and in that said first chamber comprises a section that is at least partially nested in a section of said second chamber, and wherein said first and second chambers have transversal directions, measured along the axis X, that are different.

15. The lubricating oil distributor defined by claim 14 wherein said turbine engine is an aircraft turbine engine.

16. A lubricating oil distributor for a mechanical reduction gear of a turbine engine, said distributor having a general annular shape around an axis X and comprising first and second independent oil circuits, said first oil circuit comprising a first oil inlet connected by a first annular chamber to several oil outlets, and said second oil circuit comprising a second oil inlet connected by a second annular chamber to several oil outlets, wherein said lubricating oil is formed of a single part, and in that said first chamber comprises a section that is at least partially nested in a section of said second chamber, and wherein said first and second chambers have transversal directions, measured perpendicular to said axis X, that are different.

17. The lubricating oil distributor defined by claim 16 wherein said turbine engine is an aircraft turbine engine.

18. A lubricating oil distributor for a mechanical reduction gear of a turbine engine, said distributor having a general annular shape around an axis X and comprising first and second independent oil circuits, said first oil circuit comprising a first oil inlet connected by a first annular chamber to several oil outlets, and said second oil circuit comprising a second oil inlet connected by a second annular chamber to several oil outlets, wherein said lubricating oil is formed of a single part, and in that said first chamber comprises a section that is at least partially nested in a section of said second chamber, wherein said first and second chambers are formed by two coaxial tubular rings, and wherein the ring of said first chamber comprises an outer surface that is directly connected or connected by physical bridges to an inner surface of the ring of said second chamber.

19. The lubricating oil distributor defined by claim 18 wherein said turbine engine is an aircraft turbine engine.

\* \* \* \* \*